United States Patent

[11] 3,624,798

[72] Inventor Oscar Fleischer
 Miami, Fla.
[21] Appl. No. 47,747
[22] Filed June 19, 1970
[45] Patented Nov. 30, 1971
[73] Assignee Helen Krohn Fleischer, executrix
 by said Oscar Fleischer
 Continuation-in-part of application Ser. No.
 4,216, Jan. 20, 1970. This application June
 19, 1970, Ser. No. 47,747

[54] LEVEL WIND GUIDE ATTACHEMENT FOR FISHING REELS
 8 Claims, 9 Drawing Figs.
[52] U.S. Cl. .................................................. 242/84.41,
  242/158.5
[51] Int. Cl. ..................................................... A01k 89/00,
  B65h 57/28
[50] Field of Search .......................................... 242/84.4,
  84.41, 84.42, 84.43, 158.5, 158.1

[56] References Cited
UNITED STATES PATENTS
669,249  3/1901  Bailey et al. .................. 242/84.41
1,043,397  11/1912  Capell .......................... 252/158.5 X
2,224,905  12/1940  Franz .......................... 242/158.5
2,564,086  8/1951  Von Beck ....................... 242/84.43

Primary Examiner—Billy S. Taylor
Attorney—Salvatore G. Militana

ABSTRACT: A level wind guide attachment for fishing reels adapted to be pivotally secured between the end housings of the fishing reel with an enclosed gear and worm gear in mesh engagement with each other; the worm gear being mounted on a shaft that extends beyond a housing and having a spring loaded friction wheel mounted thereon that is adapted to engage and rotate with one of the flanges of the line receiving spool. Rotating with the gear is an arm having a slot in which a cam follower and swiveled eyelet receiving the fishing line are positioned. The housing is provided with spiral interconnected slots of different diameters, one within the other in which the cam follower is slidably mounted whereby upon the revolving of the arm during the winding action of the fishing line, the latter is placed evenly on the spool.

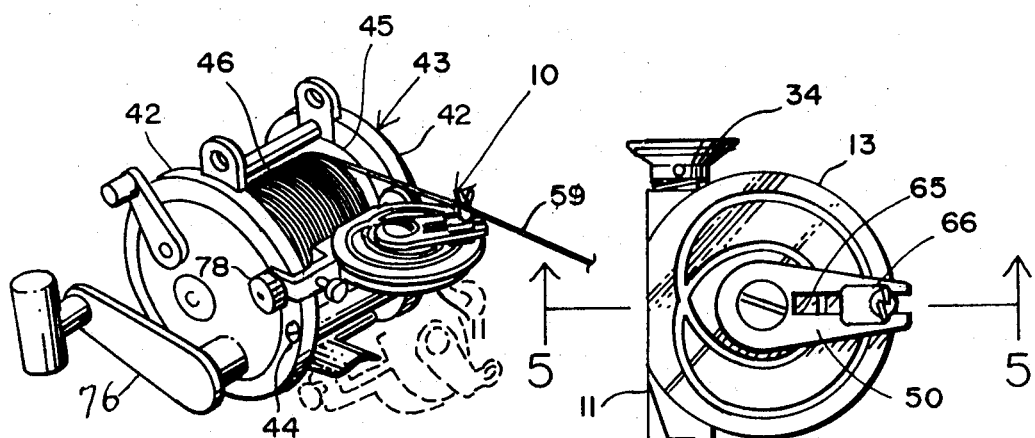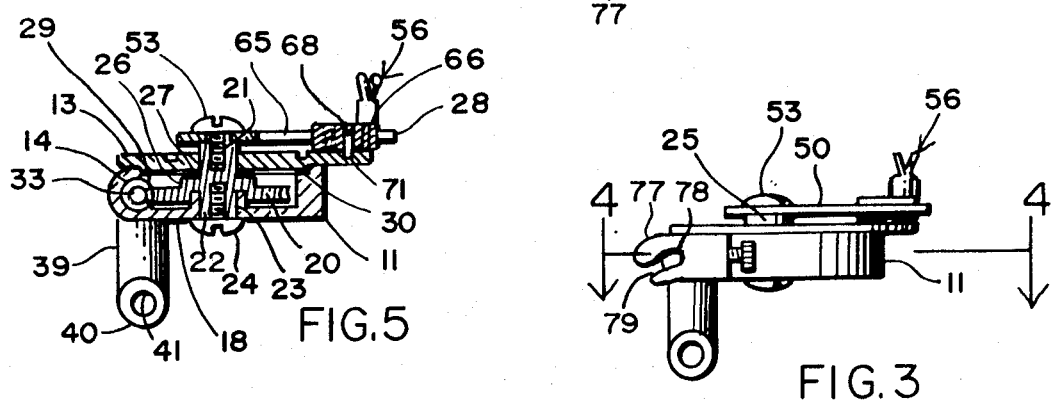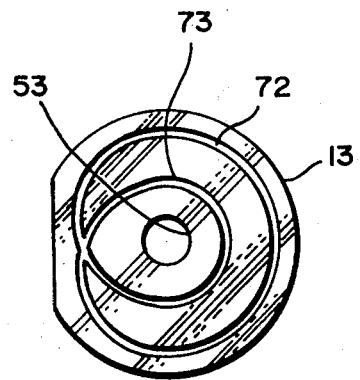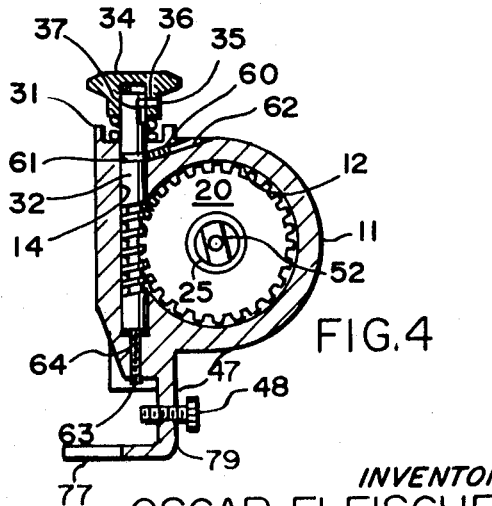

LEVEL WIND GUIDE ATTACHMENT FOR FISHING REELS

This application is a continuation-in-part of my copending application Ser. No. 4216, filed on Jan. 20, 1970, for Level Wind Guide Attachment For Fishing Reels.

BACKGROUND OF THE INVENTION

In my copending application there is shown and described a device for level winding fishing line on a fishing reel. It was found, however, that the fishing line was not wound on the reel in a substantially flat plane but instead wound on the reel in a concave shape. The attachment of the prior application appears to wind more line on the ends of the spool adjacent the flanges than along the midportion of the spool for each revolution of the level wind attachment. Although this does not seriously impair the proper operation of the fishing reel, the fisherman would prefer having the fishing line wind on the reel in a flat plane.

SUMMARY OF THE INVENTION

This invention relates to level wind guides for fishing reels and is more particularly directed to an improved level wind guide which winds the fishing line on a spool in a flat plane.

The present invention contemplates avoiding the above indicated objection to the level wind attachment of my copending application yet retains all of the advantages thereof as set forth in my copending application.

Therefore, it is a principal object of the present invention is to provide a level wind attachment for fishing reels that lays the fishing line on the reel in a flat plane as the fishing line is wound on the reel.

A principal object of the present invention is to provide a completely enclosed watertight attachment for fishing reels utilizing a cam plate and a cam follower that permits the level winding of the fishing line on the reel whereby no water, salt, grime and other foreign matter can get into the operating mechanism thereof as the line is wound on the reel in a flat plane.

Another object of the present invention is to provide a level wind guide attachment for fishing reels having a cam plate with not less than two arcuately extending and interconnected slots thereon of different diameters with a cam follower engaging the slots and mounted on a continuously rotating member that feeds the fishing line in a flat plane onto the reel as the reel is rotated by the user.

Another object of the present invention is to provide a level wind guide attachment for fishing reels that is not connected directly to the reel operating mechanism as by gears and the like whereby the attachment is readily installed on any conventional reel by the ordinary fisherman.

A further object of the present invention is to provide a level wind guide for fishing reels that is pivotally mounted on the reel and operated by frictional engagement with the spool flange thereby being readily disengaged when casting and as readily engaged when rotating the spool for winding the fishing line back onto the spool.

A still further object of the present invention is to provide a level wind attachment guide for fishing reels that is simple to manufacture, readily mounted on a conventional fishing reel and adjustable to fit various size fishing reels.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

DESCRIPTION OF THE DRAWINGS

FIG. 1 is a perspective view of a fishing reel having a level wind guide attachment constructed in accordance with my invention.

FIG. 2 is a top plan view of the attachment as seen removed from the fishing reel.

FIG. 3 is a side elevation view.

FIGS. 4 and 5 are cross sectional views taken along the lines 4—4 and 5—5 respectively of FIGS. 3 and 2 respectively.

FIG. 7 is a top plane view of the cam plate.

DETAILED DESCRIPTION OF THE PREFERRED EMBODIMENTS

Figure 8:
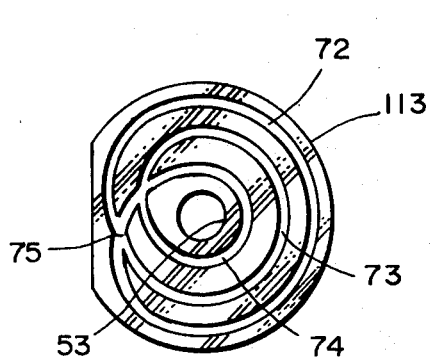
FIG. 8 is an alternate construction of the cam plate.

Referring to the drawings wherein like numerals are used to designate similar parts throughout the several views, the numeral 10 refers to my attachment for fishing reels which is capable of the winding of the fishing line in a level and regular manner and consists of a body portion 11 having an open chamber 12 enclosed by a cam plate 13.

Communicating as at 15 with the chamber 12 is a bore 14 which extends transversely of the body portion 11 to an edge portion 16 of the body portion 11 where there is an axially disposed sleeve 31 mounted thereon.

There is a bore 17 in the central portion of the base member 18 of the body portion 11 having a cylindrical sleeve portion 19 extending above the floor of the base member 18.

Rotatably mounted in the body portion 11 is gear 20 having a threaded bore 21. The gear 20 is provided with an axially disposed sleeve 22 that extends below the lower surface of the gear 20 with a peripheral slot 23 formed between the sleeve 22 and the lower surface of the gear 20 as best shown by FIG. 5. When the gear 20 is positioned in the chamber 12, the sleeve 19 of the base member 18 is received by the slot 23 of the gear 20 while the sleeve 22 of the gear 20 will extend along the bore 18 to a position slightly beyond the lower surface of the base member 18 so that when a bolt 24 is threaded into the bore 21 of the gear 20, the gear 20 will be secured in the chamber 12 and will rotate freely of the body member 11.

The gear 20 is provided with a hub portion 25 that is stepped as at 26 for receiving an O-ring 27 that is engaged at the inner periphery 28 of the cover 13 whose outer periphery is received on a ledge 29 formed about the chamber 12 with a gasket 30 placed between the cover 13 and ledge portion 29 to render the chamber 12 watertight.

Positioned in the bore 14 is a shaft 32 having a worm gear 33 in mesh engagement with the gear 20. The shaft 32 that extends beyond the sleeve 31 is provided with a pliable friction wheel 34 made of rubber and the like that rotates in unison with the shaft 32 and is maintained in the bore 14 by a setscrew 60 threaded in a bore 62 and received by a peripheral slot 61 in the shaft 32. A setscrew 35 threaded in a bore 36 formed at the base of the friction wheel 34 is received in an elongated shallow slot 37 formed longitudinally of the shaft 32. A coil spring 38 is positioned about the shaft 32 within the sleeve 31 and extends between the friction wheel 34 and the edge portion 16 of the body member 11. This structure permits the adjustment of the friction wheel 34 for fishing reels of various sizes as is explained in detail hereinafter. An adjustable thrust bearing is effected by a pointed screwbolt 63 threaded in the bore 64 and engaging the end of the shaft 32.

To the base member 18 of the attachment 10 a pair of leg portions 39 extend downwardly to a cylindrical cross member 40 that is provided by a bore 41. The cross member extends between the end casings 42 of a reel 43 and fastened thereto by bolts 44 that extend through plain bores in the end casing 42 and received by the bores 41 of the crossmember 40. The level wind guide attachment 10 is thereby capable of being swung from its operating position as shown by the solid lines in FIG. 1 to the dotted line position.

In order to maintain the friction wheel 34 in proper frictional engagement with a flange 45 of the spool 46, a tab 47 is mounted on the body member 11 extending beyond the position of the end casing 42 and terminating in an end portion 77 that lies parallel to the end casing 42. A lock bolt 78 that is threadedly mounted in a bore formed in the end casing 42 is received by an arcuate slot 79 extending from the free end of the tab end portion 77. In order that the friction wheel 34 bear against the flange 45 of the spool 46 when the level wind attachment 10 has swung to its operating position, the slot 79 is provided with an arcuate portion 80 that receives and retains the lock bolt 78. Consequently the line wind attachment 10 will operate properly even though the lock bolt 78 is not tightened against the tab end portion 77. An adjusting screw 48 which is threaded in a bore 49 engages the end casing 42 to permit the attachment 10 to swing to the proper position wherein the friction wheel 34 engages the flange 45 of the spool 46 without binding or slippage therebetween. Also, the friction wheel 34 is capable of sliding laterally on the shaft 32, a distance as determined by the length of the longitudinal slot 37 in order to adjust to various sized spools 46.

Mounted to rotate with the gear 20 is a level line winding arm 50 provided with a rectangular opening 51 that receives the slotted end 52 of the gear hub 25 whereby the arm 50 is made to rotate in unison with the gear wheel 20. The arm 50 is fastened to the gear 20 by a screw 53 that is threaded into a bore 54 in the hub 25. Extending along the free end of the arm 50 are leg portions 28 formed by an elongated slot 65 which terminates in proximity of the rectangular opening 51. Slidably mounted in the elongated slot 65 is a carrier member 66 whose side portions are slotted as at 67 for receiving the leg portion 20 of the arm 50.

Formed on the centerline of carrier member 66 is a pair of bores 68 and 69, the bore 68 extending from the lower surface and terminating short of the upper surface thereof. An upright swivel 55 which is rotatably mounted in the opening 69 is provided with a split eyelet 56 whose arm portions 57 are in overlapping relation and spaced as at 58 to permit a fishing line 59 to be slid therebetween into the center opening of the eyelet 56.

The opening 68 in the lower surface of the carrier member 66 receives a pin 70 that supports a cam follower 71. The latter is slidably positioned in a continuous slotted portion formed in the cam plate 13. The slotted portion consists of a pair of concentric and partially circular slots 72 and 73 that are connected together whereby upon rotation of the arm 50 the cam follower 71 will slide along the outer or larger circular slot 72 and then slide into and around the smaller circular slot 73 after which the cam follower 71 will return to and slide along the larger circular slot 72 as shown by FIG. 5. At the same time the carrier 66 is oscillating back and forth in the slot 65 as the arm 50 rotates with the hub 25.

It is readily noted that I have provided a level wind attachment 10 for fishing reels that may be readily mounted on fishing reels of various sizes easily and quickly. All that need be done is provide a threaded bore in each of the end casings 42 and place the cross member 40 therebetween. If the latter is too long, it may be readily cut and shortened; or if too short, spacer members may be placed at the ends thereof. The screws 44 are then threaded into the bores in the end casings 42 and received in the bores 41 of the crossmembers 40 to secure the attachment 10 to the reel 43 and permit the attachment 10 to swing in and out of operating position as shown by FIG. 1. With the attachment 10 in the operating position as shown by the solid lines, the screw 48 is adjusted against the end casing 42 so that the friction wheel 34 engages the flange 45 of the spool 46 to allow for the proper amount of friction to cause the friction wheel 34 to rotate in unison with the spool 46. Normally the lock bolt 78 will be received and seated in the arcuate slot 80 to retain the friction wheel 34 into engagement with the spool 46. The diameter of the circle circumscribed by the arm 50 will be exactly equal to the distance between the flanges 45 of the spool 46. The fishing line 59 is then inserted in the slot 58 to be received by the eyelet 56. Now when the handle 76 is rotated to wind the fishing line 59 on the spool 46, the friction wheel 34 will rotate with the flanges 45 causing the worm gear 37 and gear 20 to rotate which in turn will rotate the arm 50 in a continuous circle. As the line 59 is being wound on the spool 46 it is being carried by the eyelet 56 on the rotating arm 50 and is consequently moving from side to side of the spool 46 and causing the fishing line 59 to be placed on the spool 46. For every two revolutions of the eyelet 56, the cam follower 71 will slide along the slot of the larger circle 72 causing the fishing line 59 to be laid on the spool 46 in a row extending from one flange 45 of the spool 46 to the other flange. Then when the cam follower 71 enters the smaller circle 73, another row of fishing line 59 is laid in a row equal in length to be diameter of the circle 73 that extends only along the midportion of the spool 46. This action of the cam follower 71 sliding along the two circles or arcuate slotted portions 72 and 73 prevents the fishing line 59 from building up at a higher rate in proximity of the flanges 45 of the spool 46 so that the fishing line 59 will be wound on the spool 46 in even and flat rows.

There are occasions as when casting that it is desirous to remove the fishing line 59 from the attachment 10 and position the latter so as not to interfere with the casting operation. In the use of my attachment 10, all that need be done is to slip the fishing line 59 through the slot 58 to remove the fishing line 59 from the eyelet 56. Then the attachment 10 is pivoted on the screwbolts 44 downwardly to the dotted line position as shown by FIG. 1 to permit a person to cast the fishing line 59 if it is his desire to cast free of the attachment 10. However, the attachment 10 permits casting with the line threaded through the eyelet 56. In this instance, all he need do is pivot the attachment 10 a slight distance which removes the friction wheel 34 out of engagement with the flanges 45 of the spool 46. As soon as the person wishes to wind the fishing line 59 back on the spool 46, he swings the attachment 10 back up to its solid line position wherein the friction wheel 34 engages the flanges 45. He then slides the line 59 in the slot 58 between the eyelet arms 57 and begins to actuate the handle 60 to wind the fishing line 59 on the spool 46.

It has been noted that when using fishing line for large fish on my level wind attachment 10, there results a slight buildup of fishing line 59 at the flanges 45 of the spool 46 when winding the fishing line 59 on the spool. To avoid this, a third smaller partially circular concentric slot 74 is formed in the cam plate 113, the slot 74 being connected by an arcuate slot 75 to one end of the largest circular slot 72 as shown by FIG. 8. In this alternate construction of my level wind device as the arm 50 rotates, the cam follower 71 will slide along the outer slot 72 for approximately one revolution then around the smaller slot 73 during a second revolution of the arm 50; then around the smallest slot 74 during a third revolution after which the follower 71 will slide along the arcuate slot 75 back to the largest circular slot 72. Consequently in three revolutions of the arm 50, the fishing line 59 will be laid in three consecutive and overlying rows on the spool 46 wherein the first row will extend along the distance between the flanges 45 which is equal to the diameter of the circular slot 72, the second and third rows will extend along the midportion of the spool 46 for a distance equal to the diameters of the circular slots 73 and 74 respectively. The buildup of fishing line 59 at the flanges 45 caused by the larger circular slot 72 is evened or flattened out by the deposit of fishing line 59 at the midportions by the smaller concentric circular slots 73 and 74.

Figure 9:
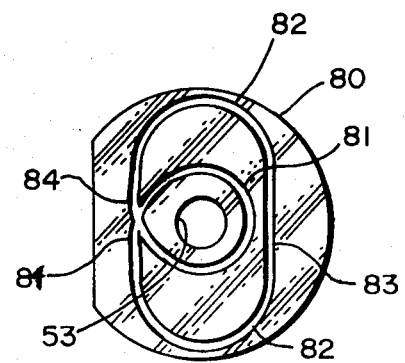
FIG. 9 is a further alternate construction of the cam plate.
Figure 6:
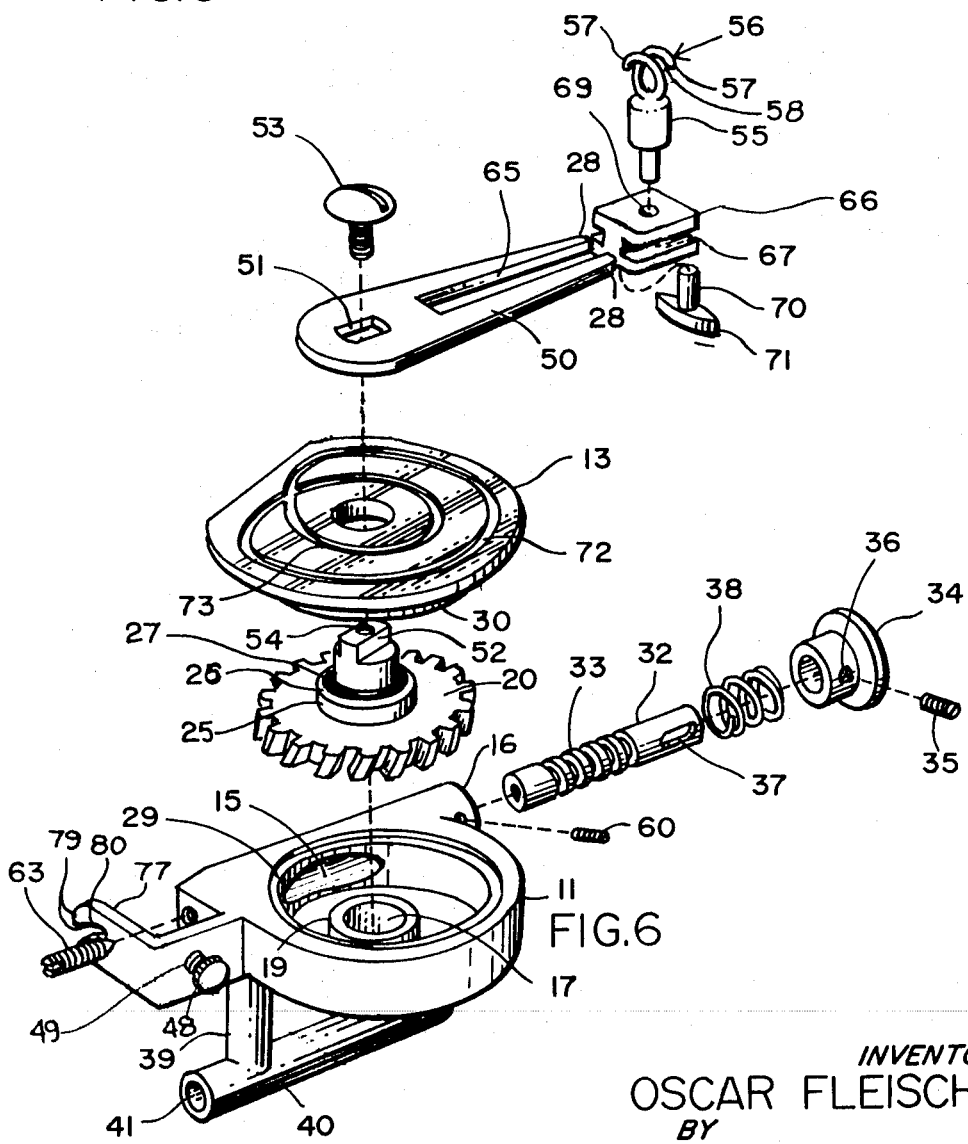
FIG. 6 is an exploded view thereof.

Another preferred embodiment of my cam plate is illustrated by FIG. 9 wherein the track system tends to avoid the building up of the fishing line 59 at the ends of the spool 46. A cam plate 80 is provided with an inner approximately circular slot 81 concentrically positioned thereon. Its end portions 84, 84 are connected to an enlarged oval shaped slot 82 having an approximately straight-lined slot 83 extending across the front portion of the cam plate 80. Upon use of the cam plate 81 on my level wind attachment 10, the fishing line 59 will tend to build up on the ends of the spool 46 as the cam follower 71 travels along the outer slot 82. As the cam follower 71 slides along the slot portions 84 and around the inner circular slot 81, the fishing line 59 will be laid along the center portion of the spool 46 so that upon the completion of two revolutions of the follower 71, the fishing line 59 will lie in a flat plane on the spool 46.

What I claim as new and desire to secure by Letters Patent of the United States is:

1. A level wind guide attachment for fishing reels having a flanged spool rotatably mounted between end casings comprising a housing, means mounted on said housing adapted to secure said attachment to a fishing reel transversely of said spool, track means mounted on said housing, gear means, pivot means rotatably mounting said gear means in said housing, a second gear in mesh engagement with said gear means, a shaft secured to said second gear and extending outwardly of said housing, friction wheel means mounted on the free end portion of said shaft adapted to engage a flange of said spool of said fishing reel whereby upon rotation of said spool when winding fishing line on said spool, said gear is rotated in unison therewith, an elongated arm, means securing said elongated arm at one end to said pivot means, carrier means slidably mounted on said elongated arm, a track follower pivotedly mounted on said carrier means and engaging said track means and fishing line guide means rotatably mounted on said carrier means for receiving and guiding said fishing line in a substantially flat plane on said spool as said elongated arm is rotated in the winding of said fishing line on said spool, and as said carrier means oscillates on said housing.

2. The structure as recited by claim 1 wherein said track means form substantially concentric circles having substantially spiral portions connecting said circles whereby said cam follower slides from one circle to the other during consecutive rotations of said elongated arm.

3. The structure as recited by claim 1 wherein said friction wheel being slidably mounted on said shaft, means limiting the sliding movement of said friction wheel and spring means yieldingly urging said friction wheel in the direction of said free end portion of said shaft.

4. The structure as recited by claim 1 wherein said means mounted on said housing adapted to secure said attachment to a fishing reel comprises a cross member secured to said housing for pivotally mounting said attachment between said end casings of said reel and tab means mounted on said housing and adapted to extend beyond one of said end casings, said tab means having a slotted portion for receiving a lock bolt when said attachment has been pivoted into operative position to wind said fishing line on said spool.

5. The structure as recited by claim 2 wherein said track means comprises a cover plate enclosing said gear means in said housing, said cover plate having an opening receiving said elongated arm securing means and an O-ring positioned adjacent said opening to seal said housing.

6. The structure as recited by claim 4 wherein said rotatable fishing line guide means comprises a pair of arcuate arm portions terminating in overlapping and spaced relation whereby said fishing line guide may be threaded through the space between said arcuate arm portions.

7. The structure as recited by claim 1 wherein said attachment securing means comprise a crossmember having bores at each end thereof and bolt means extending through said housing and received by said bores whereby said attachment may be pivoted to remove said friction wheel out of engagement with said spool and said attachment becoming inoperative.

8. The structure as recited by claim 1 wherein said track means comprise grooves forming an inner circle, an outer substantially oval shaped portion having a substantially straight portion along one side and arcuate portions at the other side joining said circle whereby said cam follower slides from said oval shaped portion to said inner circle during consecutive rotations of said elongated arm.

* * * * *